(12) United States Patent
Heimstra

(10) Patent No.: US 10,457,192 B1
(45) Date of Patent: Oct. 29, 2019

(54) LOAD SECURING BAG FOR A PICKUP TRUCK

(71) Applicant: Coralee Heimstra, Manhattan, KS (US)

(72) Inventor: Coralee Heimstra, Manhattan, KS (US)

( * ) Notice: Subject to any disclaimer, the term of this patent is extended or adjusted under 35 U.S.C. 154(b) by 49 days.

(21) Appl. No.: 15/913,215

(22) Filed: Mar. 6, 2018

Related U.S. Application Data

(60) Provisional application No. 62/467,286, filed on Mar. 6, 2017.

(51) Int. Cl.
*B60P 7/08* (2006.01)
*B60R 9/00* (2006.01)
*B60R 9/055* (2006.01)
*B60R 9/06* (2006.01)
*B65D 65/10* (2006.01)
*B60R 13/01* (2006.01)

(52) U.S. Cl.
CPC ........... *B60P 7/0876* (2013.01); *B60P 7/0823* (2013.01); *B60R 9/00* (2013.01); *B60R 9/055* (2013.01); *B60R 9/065* (2013.01); *B60R 13/01* (2013.01); *B65D 65/10* (2013.01)

(58) Field of Classification Search
USPC ....... 296/39.1, 39.2, 100.15, 100.16, 100.18, 296/37.6; 410/32, 96, 97, 100, 117, 118; 383/2, 61.3, 66, 97, 107, 108, 113, 84, 383/86, 120; 224/403, 404, 542, 572, 224/439, 498
See application file for complete search history.

(56) References Cited

U.S. PATENT DOCUMENTS

| | | | |
|---|---|---|---|
| 5,050,924 A | 9/1991 | Hansen | |
| 5,868,295 A * | 2/1999 | Carriere | B60R 9/00 224/404 |
| 6,003,929 A | 12/1999 | Birdsell | |
| 6,474,022 B1 | 11/2002 | Double | |
| 6,543,659 B2 * | 4/2003 | Blair | B60R 9/045 296/100.16 |
| 8,142,121 B2 * | 3/2012 | Griffith | B60P 7/0876 410/97 |
| 8,192,118 B2 * | 6/2012 | Zahorec | B60R 7/005 410/118 |
| 8,292,559 B1 | 10/2012 | Foggy | |
| 8,439,422 B2 | 5/2013 | Ricks, Jr. | |
| D761,715 S * | 7/2016 | Travis | D12/401 |
| 9,566,893 B2 | 2/2017 | Blohm | |
| 2010/0219657 A1 | 9/2010 | Kinley | |
| 2013/0033058 A1 * | 2/2013 | Ruffino | B60R 5/045 296/37.6 |
| 2014/0150353 A1 | 6/2014 | Ellis | |

* cited by examiner

*Primary Examiner* — Stephen T Gordon
(74) *Attorney, Agent, or Firm* — Cramer Patent & Design, PLLC; Aaron R. Cramer

(57) ABSTRACT

A load securing bag for a pickup truck comprises a cuboid-shaped bag made of durable weather-resistant material having a single gusset about the side edges of the bag. When not in use, the gusset is secured by a fastening device. There is a plurality of straps which are secured to the bag with each strap having a hook at the distal end of each strap. A bag cover made of nylon webbing also has a plurality of straps having a hook at the distal end of each strap.

20 Claims, 5 Drawing Sheets

LOAD SECURING BAG FOR A PICKUP TRUCK

RELATED APPLICATIONS

The present invention was first described in and claims the benefit of U.S. Provisional Application No. 62/467,286, filed Mar. 6, 2017, the entire disclosures of which are incorporated herein by reference.

FIELD OF THE INVENTION

The present invention relates generally to a load securing bag for removable placement within a vehicle.

BACKGROUND OF THE INVENTION

With sales at an all-time high, the popularity of the pick-up style truck as an everyday vehicle is wider spread than it ever has been. Their utility and convenience in hauling items coupled with the availability of luxury interiors and extended cab space have made the pickup a popular alternative to other vehicles. Many users add a bed cover or camper shell to their truck to increase security and provide protection from the weather for items stored in the bed. While such items certainly do work, many pickup truck owners do not utilize them due to their aesthetic impact or the fact they render the bed area unusable for other uses such as bulk material hauling, or simply the fact that they cannot afford it.

Accordingly, there exists a need for a means by which storage security and protection for the elements can be provided for items and equipment stored in the bed of a pickup truck without the use of a bed cover or camper shell. The development of the load securing bag fulfills this need.

SUMMARY OF THE INVENTION

The inventor has recognized the aforementioned issues and inherent problems and observed that there is a lack in the prior art for a load securing bag for removable placement within a vehicle.

It is therefore an object of the invention to provide a bag defining an interior comprising a top, bottom, a first side, a second side, a third side and a fourth side. The bag also comprises a first upper transverse retention strap which is secured to the top having a first upper transverse retention strap first end which in turn has a first spring loaded attachment hook at a first distal end, a first length adjustment mechanism adjacent the first spring loaded attachment hook and a first fastener adjacent the first length adjustment mechanism.

The first upper transverse retention strap also has a first upper transverse retention strap second end comprising a second spring loaded attachment hook at a second distal end, a second length adjustment mechanism adjacent the second spring loaded attachment hook and a second fastener which is adjacent the second length adjustment mechanism. This first end and second configuration is respectively the same with respect to a second upper transverse retention strap which is secured to the top and is adjacent the first upper transvers retention strap and a third upper transverse retention strap which is secured to the top and is adjacent the second upper transverse retention strap.

The bag also comprises a first upper longitudinal strap which is secured to the top and perpendicularly secured across the first transverse retention strap, the second transverse retention strap and the third transverse retention strap. The first upper longitudinal strap has a first upper longitudinal strap first end which also has spring loaded attachment hook and a first upper longitudinal strap second end which is secured to an edge of the top. The is also a second upper longitudinal strap secured to the top, adjacent the first upper longitudinal strap and perpendicularly secured across the first transverse retention strap, the second transverse retentions strap and the third transverse retention strap. The second upper longitudinal strap first end and second end are respectively configured in a manner similar to the first upper longitudinal strap.

The bag also comprises an opening which has an opening fastener disposed upon at least one (1) side of the bag. The opening is configured to removably retain an article of luggage inside. The bag is also configured to be removably secured within a truck bed by the securement of each the first spring loaded attachment hooks to a corresponding tie down anchor disposed about the truck bed.

The opening fastening means may also comprise a first zipper. The bottom of the bag may comprise a waterproof coating which may be rubber and may extend from the bottom of the bag to no less than four inches (4 in.) onto the outer surface of the first, second, third side and the fourth side. A gusset may be configured and disposed about the first, second, third side and the fourth side and may have a gusset fastener. The gusset may be disposed adjacent the first zipper and may possess a second zipper. The opening may be disposed on the first and second side of the bag. A lid may also be provided which is configured to be removably secured to the top of the bag.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
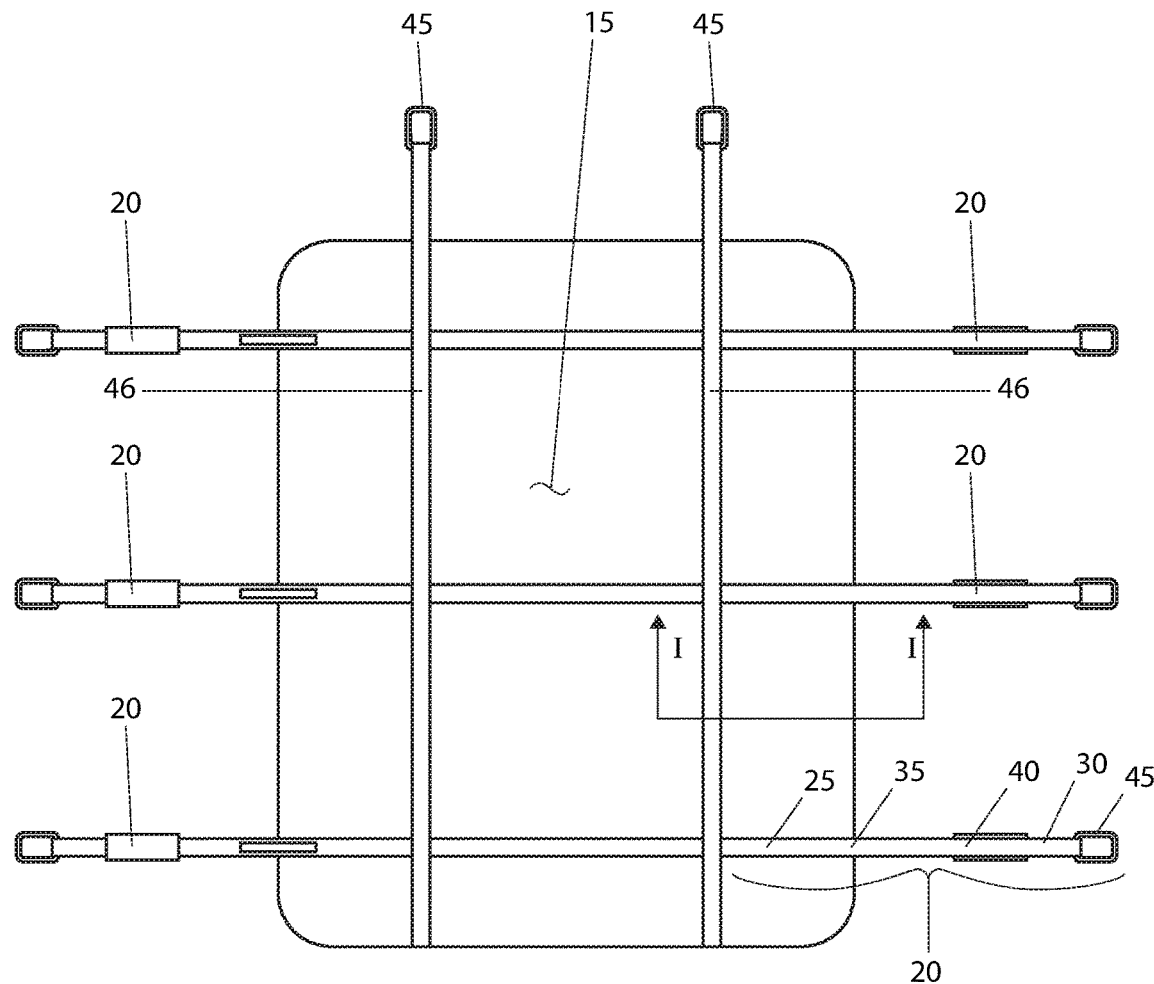
FIG. 1 is a top view of the weatherproof cargo bag for pickup trucks, according to the preferred embodiment of the present invention.

DESCRIPTIVE KEY 10 weatherproof cargo bag
15 bag-like structure
20 upper transverse retention strap
25 upper strap section
30 lower strap section
35 hook-and-loop fastener
40 length adjustment mechanism
45 spring-loaded attachment hook 46 upper longitudinal strap
50 gusset closure
55 opening zipper
60 side surface
65 lower end
70 upper end
75 lid surface
80 waterproofing material
85 lower retention strap
90 first zipper
95 first rain flap
100 second zipper
105 second rain flap
110 gusset material
115 pickup truck
120 pickup truck bed
125 tie down point
130 tailgate
135 storage bag

DETAILED DESCRIPTION OF THE PREFERRED EMBODIMENT

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, a top view of the weatherproof cargo bag 10, according to the preferred embodiment of the present invention, is disclosed. The weatherproof cargo bag 10 (herein described as the "device") 10, includes a bag-like structure 15 that is placed within the bed area 120 of an open pickup truck 115. The bag-like structure 15 provides complete coverage and environmental protection on all six (6) sides. The bag-like structure 15 would be made of a durable material such as nylon, canvas, Tyvek®, or the like. The particular use of any material(s) is not intended to be a limiting factor of the present invention. The overall size of the device 10 can vary per application, vehicle, or the like.

However, a common width is envisioned as four feet (4 ft.) wide, with a common depth of eight feet (8 ft.). The overall height will be described in greater detail herein below. The top of the device 10 is provided with six (6) upper transverse retention straps 20 that are commonly connected into three (3) strap pairs. Each upper transverse retention straps 20 is comprised of an upper strap section 25, a lower strap section 30, a hook-and-loop fastener 35, a length adjustment mechanism 40, and a spring-loaded attachment hook 45. The upper strap section 25 is attached to the bag-like structure 15 via heavy duty stitching, rivets, or other commonly known attachment method. The upper strap section 25 may also comprise a complete net arrangement over the top of the bag-like structure 15, similar in appearance to a cargo net that is not physically attached to the bag-like structure 15. Additionally, the top of the device 10 is provided with two (2) upper longitudinal straps 46 that are not physically fastened to the top of the device 10 (only physically fastened on bottom to allow for opening of device 10).

The upper longitudinal straps 46 further secure any contained load, particularly if the tailgate of the truck is left in down position. The upper longitudinal straps 46 are also provided with spring-loaded attachment hooks 45 as well. The particular use of any type of upper transverse retention straps 20 or upper longitudinal straps 46 are not intended to be a limiting factor of the present invention. The length adjustment mechanism 40 serves to adjust the length of the lower strap section 30 in relation to the upper strap section 25, so that the bag-like structure 15 and contents therein can be satisfactorily secured in the bed of a pickup truck 120. Any excess lower strap section 30 because of tightening will be secured by the hook-and-loop fastener 35, such as Velcro®. The spring-loaded attachment hook 45 such as a spring hook, clasp, or carabiner, is used to secure the upper transverse retention straps 20, and thus the device 10, to the structure of the pickup truck such as a tie-down point. The captive arrangement of the spring-loaded attachment hook 45 prevents inadvertent dislodgement.

Figure 2:
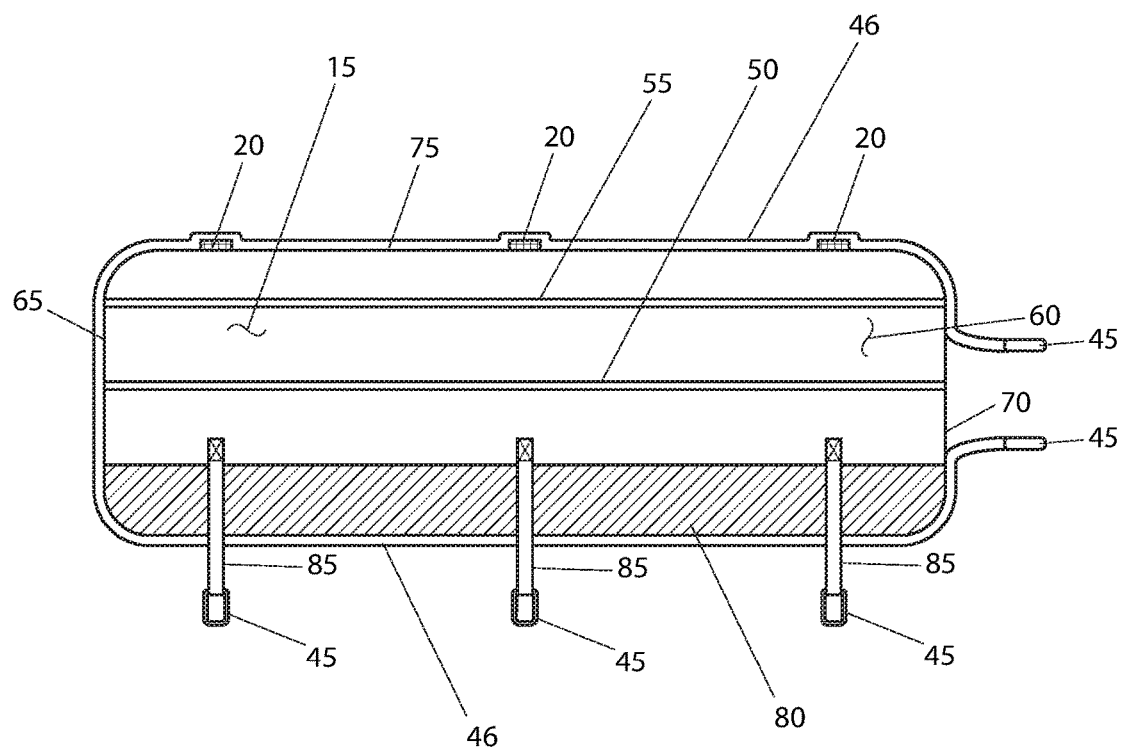
FIG. 2 is a side view of the weatherproof cargo bag for pickup trucks, according to the preferred embodiment of the present invention.

Referring next to FIG. 2, a side view of the device 10, according to the preferred embodiment of the present invention is depicted. This view partially show three (3) upper transverse retention straps 20 due to illustrative limitations. The overall height of the bag-like structure 15 can once again vary per specific application but a typical version would be approximately two feet (2 ft.) tall. However, a gusset closure 50 provides for additional height (envisioned to be approximately eighteen inches (18 in.)) and will be described in greater detail herein below. The gusset closure 50 extends for the entire perimeter of the bag-like structure 15. An opening zipper 55 is provided immediately above the gusset closure 50 and extends on both side surface 60 (one (1) of which is shown in FIG. 2) and the lower end 65 (located near the tailgate when placed in a pickup truck bed). The opening zipper 55 does not provide coverage for the upper end 70 (located near the passenger cab area when placed in a pickup truck bed), since total removal of lid surface 75 is not necessary to provide complete access to the interior of the bag-like structure 15.

The lower portion of the bag-like structure 15, envisioned to be approximately four inches (4 in.) is provided with a waterproofing material 80 such as rubber coating or the like which is applied in a dipping or coating process. The waterproofing material 80 provides protection against rain, snow, and other moisture issues especially in driving rains where water may accumulate in the bed of the pickup truck. A total of six (6) lower retention straps 85 (of which three (3) are shown due to illustrative limitations) are provided in groups of three (3) on each side surface 60. Also visible in this figure is one (1) of the two (2) upper longitudinal straps 46 complete with the spring-loaded attachment hooks 45 which are attached to any available retention point within the bed of the pickup truck. As aforementioned described, the upper longitudinal straps 46 are physically fastened to the waterproofing material 80 via heavy duty stitching, rivets, or other commonly known attachment method. The lower retention straps 85 and the upper longitudinal straps 46 are envisioned to be a fixed length and attach to various tie down points at the lower edge of the pickup truck bed. Each lower retention straps 85 is also provided with a spring-loaded attachment hook 45 which functions in a similar manner to that used with the upper strap section 25 as aforementioned described in FIG. 1.

Figure 3:
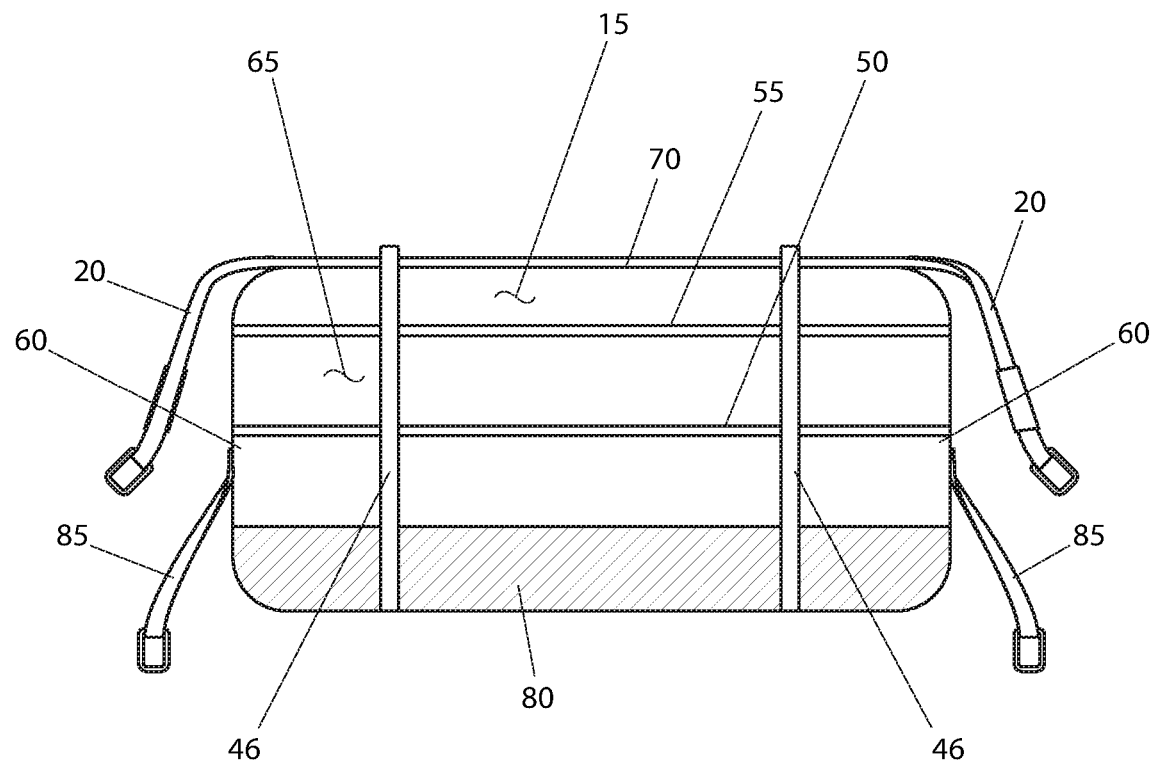
FIG. 3 is an end view of the weatherproof cargo bag for pickup trucks 10, according to the preferred embodiment of the present invention.
Figure 3:
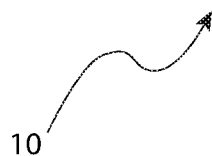

Referring now to FIG. 3, an end view of the device 10, according to the preferred embodiment of the present invention is shown. This end view is the apparent view of the device 10 when viewed from the tailgate area of the pickup truck bed with the tailgate in a down position. The waterproofing material 80 is apparent about the total lower surface of the bag-like structure 15. The upper transverse retention straps 20 (two (2) of the total six (6) are shown due to illustrative limitations) are attached to the upper end 70. The lower retention straps 85 (two (2) of the total six (6) are shown (due to illustrative limitations) are attached to the side surface 60. One (1) of the three (3) upper strap section 25 are visible (due to illustrative limitations) as well as both of the upper longitudinal straps 46. Finally, the gusset closure 50 and the opening zipper 55 are readily visible as well.

Figure 4:
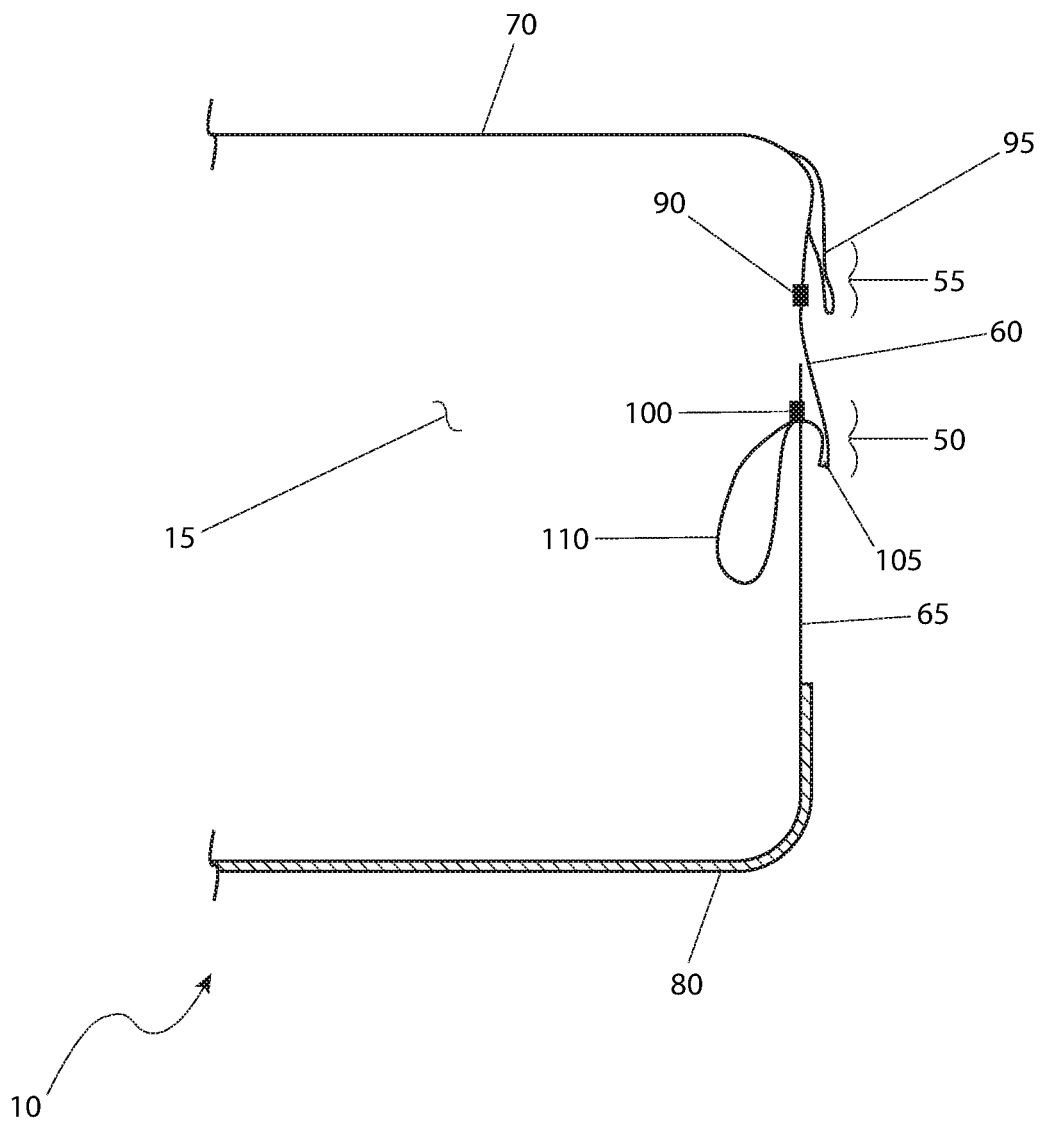
FIG. 4 is a sectional view of the weatherproof cargo bag for pickup trucks 10, as seen along a line I-I, as shown in FIG. 1, according to the preferred embodiment of the present invention; and, FIG. 5 is a perspective view of the weatherproof cargo bag for pickup trucks 10, shown in a utilized state on a pickup truck 115, according to the preferred embodiment of the present invention.

Referring next to FIG. 4, a sectional view of the device 10, as seen along a line I-I, as shown in FIG. 1, according to the preferred embodiment of the present invention is disclosed. The side surface 60, upper end 70, and the waterproofing material 80 are readily seen in this disclosure. The opening zipper 55 includes a first zipper 90 and a first rain flap 95. The first zipper 90 allows for access into the interior of the bag-like structure 15 as aforementioned described. The first rain flap 95 prevents ready entrance of water from rain through the first zipper 90 under normal usage. The gusset closure 50 consists of a second zipper 100, a second rain flap 105 and gusset material 110. When the second zipper 100 is opened, the gusset material 110 envisioned to be approximately twelve to eighteen inches (12-18 in.) in total length is deployed to allow for an overall higher height of the device 10. This increase in height is envisioned to allow for storage and transport of larger objects such as mattresses, box springs, and the like. It is also envisioned that the second zipper 100 could be partially opened to allow for only one side of the device 10 to have a higher height. As before, the second rain flap 105 prevents entrance of water from rain through the second zipper 100 under normal usage.

Figure 5:
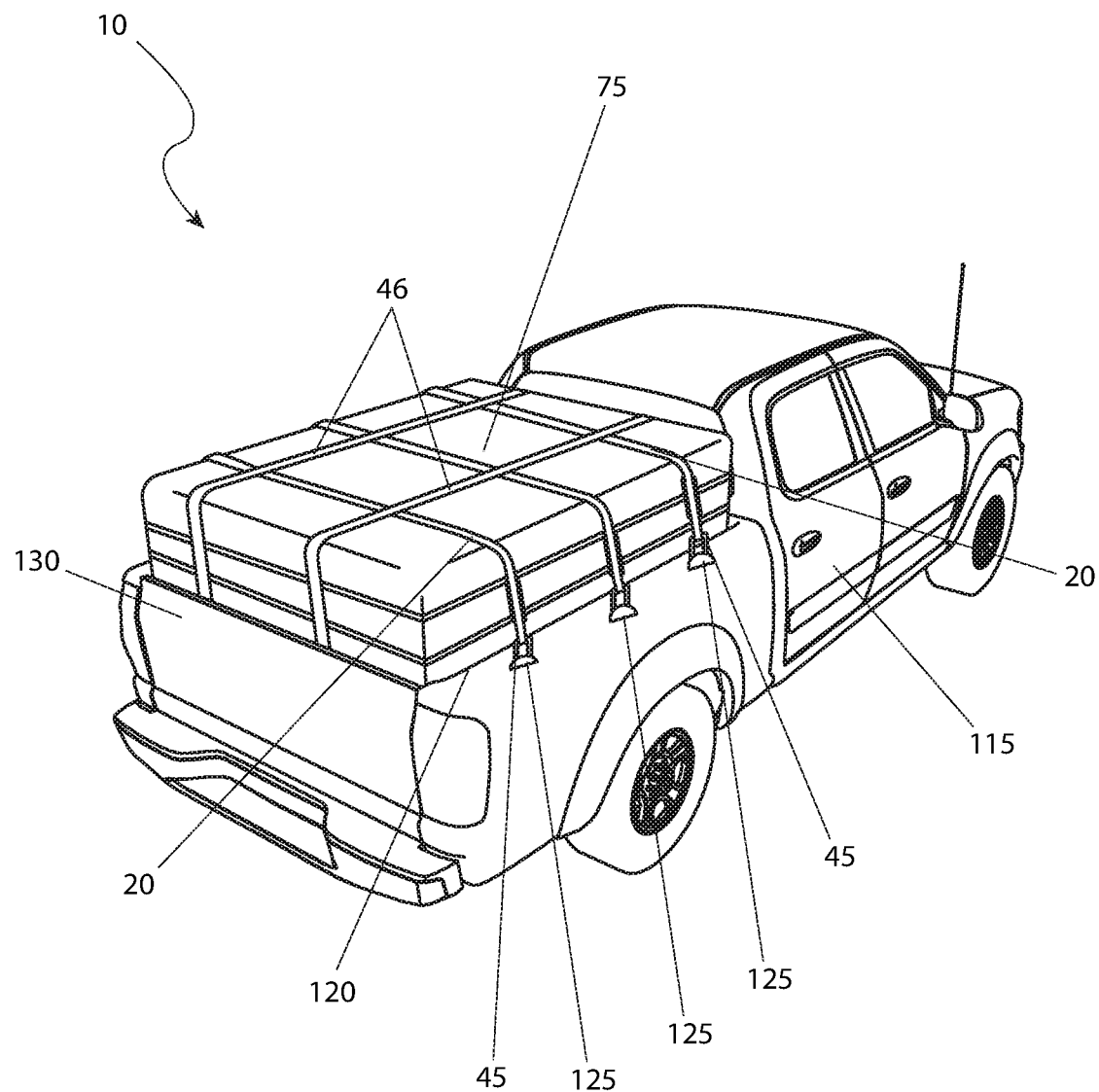

Referring finally to FIG. 5, a perspective view of the device 10, shown in a utilized state on a pickup truck 115, according to the preferred embodiment of the present invention is depicted. The device 10 is placed into a pickup truck bed 120 of the pickup truck 115. The spring-loaded attachment hook 45 of the upper transverse retention straps 20 (three (3) of the total six (6) are shown due to illustrative limitations) are attached to tie down points 125 that are customarily available in the pickup truck bed 120. The placement of the lid surface 75 still allows for vision through the rear window of the pickup truck 115.

The device 10 as shown in FIG. 5 does not take advantage of the additional internal storage space afforded by the gusset material 110 (as shown in FIG. 4). The increase in overall height of the device 10 afforded by use of the gusset material 110 (as shown in FIG. 4) would likely block rearward vision through the rear window of the pickup truck 115 if deployed. Additional securement of the device 10 may be afforded by use of the lower strap section 30 (not shown in this figure due to illustrative limitations) as well as the upper longitudinal straps 46. The upper longitudinal straps 46 are viewed as particularly beneficial should the tailgate 130 be in an open or down position in lieu of the closed or up position as shown. Such a decision on use of the lower strap section 30 (as shown in FIG. 2 and FIG. 3) as well as the upper longitudinal straps 46 would be made based upon size, configuration, and weight of material contained within the device 10 as well as distance and terrain to be travelled. It should be noted that the tailgate 130 of the pickup truck 115 may be in an either up or down position depending on use of configuration of the device 10. While in an upright position the tailgate 130 aids in retention of the device 10 within the pickup truck bed 120 while in motion. While in a down position, the pickup truck bed 120 affords use of a larger device 10 to the successful transport of longer objects and items. When not in use, the device 10 would be collapsed, folded, and stored within a storage bag 135 and placed within a secure location inside of the pickup truck 115.

The preferred embodiment of the present invention can be utilized by the common user in a simple and effortless manner with little or no training. It is envisioned that the device 10 would be constructed in general accordance with FIG. 1 through FIG. 5. Various factors to be considered before manufacture or procurement of a device 10 include size of pickup truck bed 120, items to be carried in the device 10, road conditions and the like.

Upon successful procurement of the device 10, it is removed from its storage bag 135 and placed in the pickup truck bed 120. It is unfolded and arranged so that the upper end 70 is positioned near the cab of the pickup truck 115. The lower strap section 30 (six (6) total) are attached to lower tie points in the pickup truck bed 120 as needed. The lower portion of the upper longitudinal straps 46 would be attached to lower tie points in the pickup truck bed 120 as needed as well. The lid surface 75 is opened by unzipping the first zipper 90 and the lid surface 75 is placed up on the roof of the truck cab. Should additional storage space inside of the device 10 be needed, the second zipper 100 is unzipped to take advantage of the gusset material 110. At this point in time, the device 10 is ready for loading.

Once the device 10 is loaded, the lid surface 75 is replaced and secured by closing the first zipper 90. Next, the upper transverse retention straps 20 (six (6) total) are secured to the tie down points 125 and tightened by use of the length adjustment mechanism 40. Any loose lower strap section 30 is secured by the hook-and-loop fastener 35. The upper portion of the upper longitudinal straps 46 would be connected to any additional tie down retention points as well. It is recommended, but not necessary, that the tailgate 130 be closed to further secure the load. At this point in time, the pickup truck 115 can be moved to transport the device 10 as well as its contained items.

Upon arrival at the destination, the above process is reversed to remove the stored materials from the device 10 as well as to allow for removal of the device 10 from the pickup truck bed 120 of the pickup truck 115. The device 10 may then be folded and stored within its storage bag 135 until needed again in a cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:
1. A bag defining an interior comprising:
a top;
a bottom;
a first side;
a second side;

a third side;
a fourth side;
a first upper transverse retention strap secured to said top comprising:
  a first upper transverse retention strap first end comprising:
    a first spring loaded attachment hook at a first distal end;
    a first length adjustment mechanism adjacent said first spring loaded attachment hook; and,
    a first fastener adjacent said first length adjustment mechanism;
  a first upper transverse retention strap second end comprising:
    a second spring loaded attachment hook at a second distal end;
    a second length adjustment mechanism adjacent said second spring loaded attachment hook; and,
    a second fastener adjacent said second length adjustment mechanism;
a second upper transverse retention strap secured to said top adjacent said first upper transverse retention strap comprising:
  a second upper transverse retention strap first end comprising:
    a third spring loaded attachment hook at a third distal end;
    a third length adjustment mechanism adjacent said third spring loaded attachment hook; and,
    a third fastener adjacent said third length adjustment mechanism;
  a second upper transverse retention strap second end comprising:
    a fourth spring loaded attachment hook at a fourth distal end;
    a fourth length adjustment mechanism adjacent said fourth spring loaded attachment hook; and,
    a fourth fastener adjacent said fourth length adjustment mechanism;
a third upper transverse retention strap secured to said top, adjacent said second upper transverse retention strap comprising:
  a third upper transverse retention strap first end comprising:
    a fifth spring loaded attachment hook at a fifth distal end;
    a fifth length adjustment mechanism adjacent said fifth spring loaded attachment hook; and,
    a fifth fastener adjacent said fifth length adjustment mechanism;
  a third upper transverse retention strap second end comprising:
    a sixth spring loaded attachment hook at a sixth distal end;
    a sixth length adjustment mechanism adjacent said sixth spring loaded attachment hook; and,
    a sixth fastener adjacent said sixth length adjustment mechanism;
a first upper longitudinal strap secured to said top and perpendicularly secured across said first transverse retention strap, said second transverse retention strap and said third transverse retention strap comprising:
  a first upper longitudinal strap first end comprising a seventh spring loaded attachment hook; and,
  a first upper longitudinal strap second end secured to an edge of said top;
a second upper longitudinal strap secured to said top, adjacent said first upper longitudinal strap and perpendicularly secured across said first transverse retention strap, said second transverse retention strap and said third transverse retention strap comprising:
  a second upper longitudinal strap first end comprising an eighth spring loaded attachment hook; and,
  a second upper longitudinal strap second end secured to an edge of said top adjacent said first upper longitudinal strap second end;
an opening having an opening fastener disposed upon at least one side of said bag;
wherein said opening is configured to removably retain an article of luggage therein; and,
wherein said bag is configured to be removeably secured within a truck bed by securement of each of said first spring loaded attachment hook, second spring loaded attachment hook, third spring loaded attachment hook, fourth spring loaded attachment hook, fifth spring loaded attachment hook, sixth spring loaded attachment hook, seventh spring loaded attachment hook and eighth spring loaded attachment hook to a corresponding tie down anchor disposed about said truck bed.

2. The bag of claim 1, wherein said opening fastener comprises a first zipper.

3. The bag of claim 1, wherein said bottom comprises a waterproof coating.

4. The bag of claim 3, wherein said coating comprises rubber.

5. The bag of claim 4, wherein said coating extends from said bottom to no less than four inches onto an outer surface of said first side, said second side, said third side and said fourth side.

6. The bag of claim 1, comprising a gusset configured and disposed about said first side, said second side, said third side and said fourth side and having a gusset fastener.

7. The bag of claim 6, wherein said gusset is disposed adjacent a first zipper of said opening fastener.

8. The bag of claim 6, wherein said gusset fastener comprises a second zipper.

9. The bag of claim 1, wherein said opening is disposed on said first side and said second side.

10. The bag of claim 1, comprising a lid capable of being removably secured upon said top.

11. A bag defining an interior comprising:
a top;
a bottom;
a first side;
a second side;
a third side;
a fourth side;
a first upper transverse retention strap secured to said top comprising:
  a first upper transverse retention strap first end comprising:
    a first spring loaded attachment hook at a first distal end;
    a first length adjustment mechanism adjacent said first spring loaded attachment hook; and,
    a first fastener adjacent said first length adjustment mechanism;
  a first upper transverse retention strap second end comprising:
    a second spring loaded attachment hook at a second distal end;
    a second length adjustment mechanism adjacent said second spring loaded attachment hook; and, a second fastener adjacent said second length adjustment mechanism;
a second upper transverse retention strap secured to said top adjacent said first upper transverse retention strap comprising:
  a second upper transverse retention strap first end comprising:
    a third spring loaded attachment hook at a third distal end;
    a third length adjustment mechanism adjacent said third spring loaded attachment hook; and,
    a third fastener adjacent said third length adjustment mechanism;
  a second upper transverse retention strap second end comprising:
    a fourth spring loaded attachment hook at a fourth distal end;
    a fourth length adjustment mechanism adjacent said fourth spring loaded attachment hook; and,
    a fourth fastener adjacent said fourth length adjustment mechanism;
a third upper transverse retention strap secured to said top, adjacent said second upper transverse retention strap comprising:
  a third upper transverse retention strap first end comprising:
    a fifth spring loaded attachment hook at a fifth distal end;
    a fifth length adjustment mechanism adjacent said fifth spring loaded attachment hook; and,
    a fifth fastener adjacent said fifth length adjustment mechanism;
  a third upper transverse retention strap second end comprising:
    a sixth spring loaded attachment hook at a sixth distal end;
    a sixth length adjustment mechanism adjacent said sixth spring loaded attachment hook; and,
    a sixth fastener adjacent said sixth length adjustment mechanism;
a first upper longitudinal strap secured to said top and perpendicularly secured across said first transverse retention strap, said second transverse retention strap and said third transverse retention strap comprising:
  a first upper longitudinal strap first end comprising a seventh spring loaded attachment hook; and,
  a first upper longitudinal strap second end secured to an edge of said top;
a second upper longitudinal strap secured to said top, adjacent said first upper longitudinal strap and perpendicularly secured across said first transverse retention strap, said second transverse retention strap and said third transverse retention strap comprising:
  a second upper longitudinal strap first end comprising an eighth spring loaded attachment hook; and,
  a second upper longitudinal strap second end secured to an edge of said top adjacent said first upper longitudinal strap second end;
an opening having an opening fastener disposed upon at least one side of said bag; and,
a rain shield secured behind said opening opposite said opening fastener;
wherein said opening is configured to removably retain an article of luggage therein; and,
wherein said bag is configured to be removeably secured within a truck bed by securement of each of said first spring loaded attachment hook, second spring loaded attachment hook, third spring loaded attachment hook, fourth spring loaded attachment hook, fifth spring loaded attachment hook, sixth spring loaded attachment hook, seventh spring loaded attachment hook and eighth spring loaded attachment hook to a corresponding tie down anchor disposed about said truck bed.

12. The bag of claim 11, wherein said opening fastener comprises a first zipper.

13. The bag of claim 11, wherein said bottom comprises a waterproof coating.

14. The bag of claim 13, wherein said coating comprises rubber.

15. The bag of claim 14, wherein said coating extends from said bottom to no less than four inches onto an outer surface of said first side, said second side, said third side and said fourth side.

16. The bag of claim 11, comprising a gusset configured and disposed about said first side, said second side, said third side and said fourth side and having a gusset fastener.

17. The bag of claim 16, wherein said gusset is disposed adjacent a first zipper of said opening fastener.

18. The bag of claim 16, wherein said gusset fastener comprises a second zipper.

19. The bag of claim 11, wherein said opening is disposed on said first side and said second side.

20. The bag of claim 11, comprising a lid capable of being removably secured upon said top.

* * * * *